July 16, 1935.  F. F. C. RIPPON  2,008,189
GAME
Filed Dec. 28, 1933
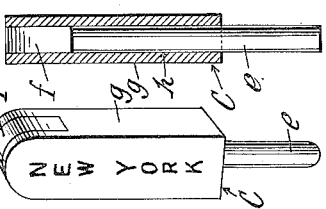
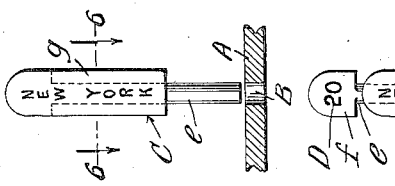
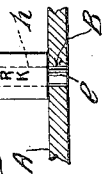
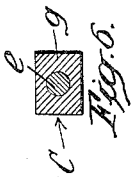
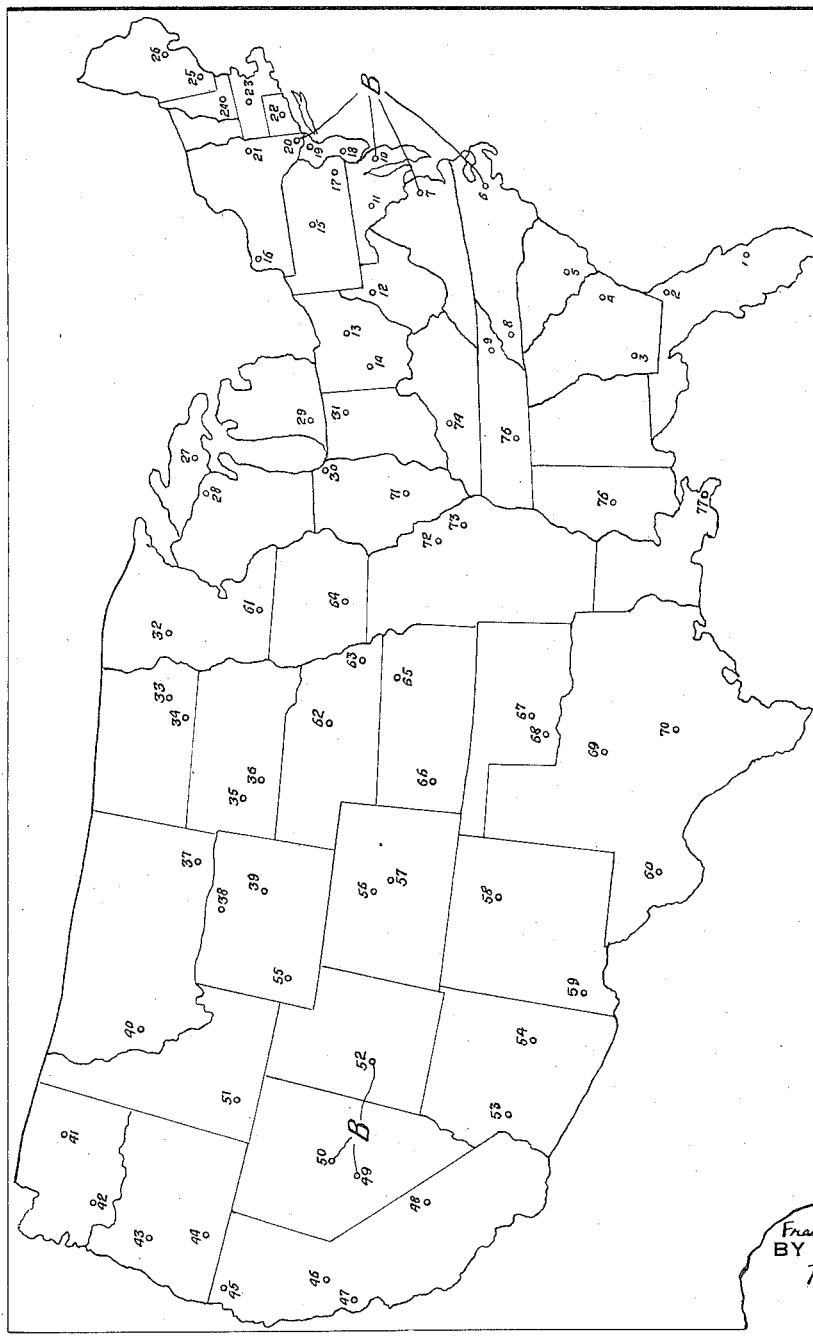
INVENTOR
Francis Felix Claude Rippon
BY Robert W Byerly
ATTORNEY

Patented July 16, 1935

2,008,189

UNITED STATES PATENT OFFICE 2,008,189

GAME

Francis Felix Claude Rippon, New York, N. Y.

Application December 28, 1933, Serial No. 704,240

6 Claims. (Cl. 273—130)

This invention relates to games and aims to provide a new game which is at the same time amusing and instructive.

A game embodying the invention consists of a member displaying a plurality of spaced indicia (which I term a "playing board"), a plurality of members (which I term "pieces") applicable to the playing board and each bearing an indicium corresponding to but not identical with one of the indicia on the board, and indicating means located partly on the board and partly on the pieces and actuated by the act of applying any piece to the board to indicate whether or not the indicium on the piece corresponds to the indicium at the location on the board at which the piece has been applied. The indicating means most desirably consists of pairs of corresponding symbols, such as numbers, applied to the indicia on the board and to the pieces having corresponding indicia, and a concealing means for one symbol of each pair of symbols which is displayed by the act of applying any piece to the board. In playing the game, a player endeavors to apply each piece to the board at the indicium on the board corresponding to the indicium on the piece. The act of applying the piece discloses the concealed symbol of a pair of symbols and thus indicates whether or not the play is correct.

The indicia on the board and pieces and the structure and arrangement of the indicating means are subject to wide variation, and it is to be understood that the invention is not limited in its application to the details of construction and arrangement of parts illustrated in the accompanying drawing. I have, for the sake of illustration, shown in the accompanying drawing a specific embodiment of the invention from which the nature of the invention may be clearly understood.

In the drawing:

Fig. 1 is a plan view of the board;

Fig. 2 is a perspective view of one of the pieces;

Fig. 3 is a side view partly in cross-section of the piece shown in Fig. 2;

Fig. 4 is a front view of the piece shown in Fig. 2 prior to being applied to the board, which is indicated in cross-section;

Fig. 5 is a front view of the member illustrated in Fig. 4 after having been applied to the board, which is indicated in cross-section; and Fig. 6 is a cross-section taken on the line 6—6 of Fig. 4.

In the specific embodiment of the invention shown in the drawing, the board A displays a map of the United States and sockets B are provided therein, indicating, by their position, the leading cities. The names of the cities represented by the sockets are not given on the face of the map, the player or players being required to select and apply to each socket on the map a piece C bearing the name of the city indicated by the position of the socket.

As illustrated herein, the names of the cities indicated by the position of the sockets on the face of the map are respectively displayed on pieces C which are adapted to be inserted in the sockets B. In addition to the name of the city indicated by one of the sockets on the map, each of said pieces C bears a symbol or number D which is concealed until the player has committed himself by inserting the piece in one of the sockets B. The concealed symbol of each piece corresponds with a symbol or number on the map at or near the location of the city whose name is displayed by that piece. Thus it will be seen that if a piece C is correctly applied, this fact will be visually demonstrated as soon as its symbol D is revealed, since the symbol on the board and the symbol D will be identical, and conversely the symbol on the board and the symbol D will not be identical if the piece has been incorrectly applied.

As illustrated herein, the pieces C consist of two parts, namely, pins $e$ having heads $f$ numbered serially to correspond to the numbers appearing on the face of the map, and body portions $g$ each having a central bore $h$ within which the pin $e$ is movable. The body portion $g$ serves to display the name of the city, and it is also cut away at the top to receive the head of the pin and to shield the number thereon, indicated generally as D. Normally the pin head $f$ bearing the symbol D is concealed by the body portion $g$, as illustrated in Figs. 2, 3 and 4. The body portion also encloses the greater part of the shank of the pin $e$, and, therefore, constitutes the part of the piece which is grasped by the player. In playing the piece, the player inserts the end of the pin in one of the sockets B and, in the act of pushing the end of the pin into the socket, slides the body portion down the shank of the pin so that the symbol D on the pin head $f$ is exposed as indicated in Fig. 5. If the piece marked "New York" has been inserted in the correct socket in the map, this fact will be visually demonstrated because the symbol 20 on the pin head will correspond with the symbol 20 on the map. If, however, the piece marked "New York" should be incorrectly inserted in the socket 30 representing the city of Chicago, the incorrectness of the move would be demonstrated immediately, since the number 20 on the pin head would not correspond with the number 30 on the map.

It will be readily appreciated that the game described herein will not only provide amusement because of the element of suspense provided by the concealment of the number D carried on the pin head and the dramatic manner in which the correctness or incorrectness of each move is visually demonstrated, but that it is also a valuable means of instruction. The game has the further advantage that it may be enjoyably used by a single individual or by a number of persons competing against one another. When two persons are competing, the pieces C may be divided equally between the players and a score kept to see which of the players can apply all of his pieces with the fewest mistakes. Similarly, if more than two players are competing, the pieces C may be distributed between the players, or sides may be chosen, and the pieces C divided between each side, the players on each side taking turns. A large number of variations and modifications of the game are possible and are contemplated, and the terminology used herein is for the purpose of illustration and not of limitation, the scope of the invention being indicated in the appended claims.

What I claim is:

1. A new game, comprising the combination of a playing board displaying a plurality of spaced indicia, a plurality of pieces each displaying an indicium related to one of the indicia on the board, and means actuated by the application of a piece to the board at any indicium thereon to indicate whether the indicium on the piece relates to the indicium on the board where the piece is applied.

2. A new game, comprising the combination of a playing board displaying a plurality of spaced indicia, a plurality of pieces each displaying an indicium related to one of the indicia on the board and carryng a normally concealed symbol similar to the symbol located at said indicium on the board, and means actuated by the application of any piece to the board at any indicium thereon to display the normally concealed symbol on the piece and thereby indicate whether the indicium on the piece corresponds to the indicium on the board where the piece has been applied.

3. A new game, comprising the combination of a playing board displaying a map and a plurality of spaced symbols thereon, a plurality of pieces each having a normally concealed symbol similar to one of the symbols on the board and a constantly displayed indicium designating the place on the map located at the corresponding symbol thereon, and means actuated by the application of any piece to the board at any symbol thereon to disclose the symbol on the piece.

4. A new game, comprising the combination of a playing board displaying a map and a plurality of spaced symbols and containing a socket adjacent to each symbol, and a plurality of pieces each bearing a symbol similar to one of the symbols on the board and an indicium designating the locality of the socket adjacent to the corresponding symbol on the board and having a pin insertable in any socket on the board and means normally concealing its symbol and automatically displaced from concealing position by insertion of the pin of the piece in any socket on the board.

5. A piece for use with a playing board containing sockets, comprising a pin having a shank and a head displaying a symbol on its side, and a body portion enclosing all of the pin but its lower portion and slidable on the pin to disclose the symbol on the head of the pin.

6. A piece for use with a playing board, comprising a body portion carrying an indicium, a slide enclosed within the body portion and having a shaft projecting through the bottom of the body portion, and a symbol-bearing head projectable through the top of the body portion.

FRANCIS FELIX CLAUDE RIPPON.

CERTIFICATE OF CORRECTION.

Patent No. 2,008,189.                        July 16, 1935.

FRANCIS FELIX CLAUDE RIPPON.

It is hereby certified that error appears in the printed specification of the above numbered patent requiring correction as follows: Page 1, first column, line 21, for "displayed" read displaced; and second column, line 10, strike out the word "respectively"; and that the said Letters Patent should be read with these corrections therein that the same may conform to the record of the case in the Patent Office.

Signed and sealed this 10th day of September, A. D. 1935.

Leslie Frazer

(Seal)                                         Acting Commissioner of Patents.